1,875,964

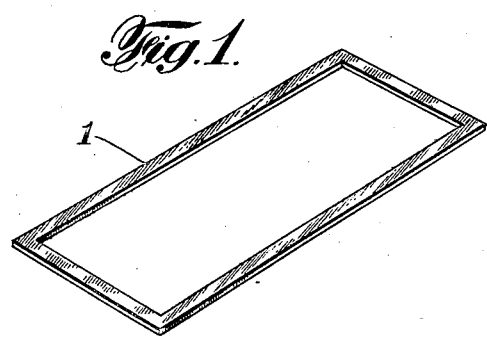
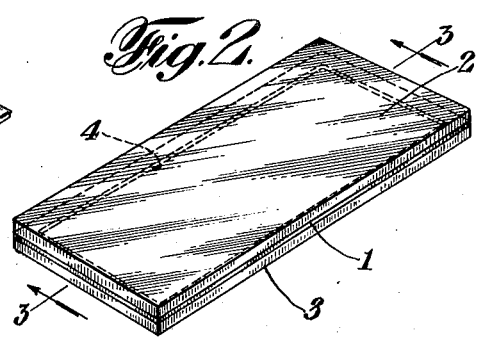
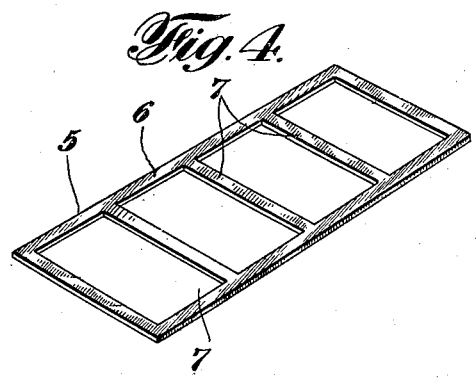
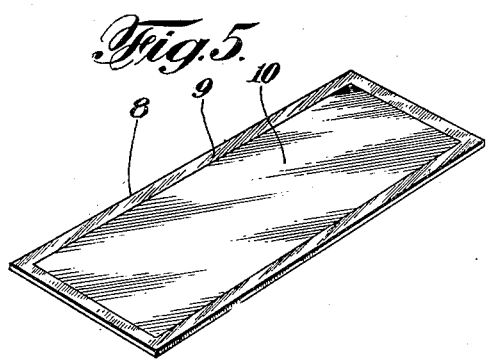
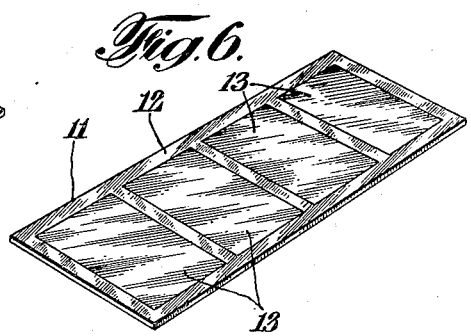
INVENTOR
JAMES F. WALSH Sept. 6, 1932.  J. F. WALSH  1,875,964
LAMINATED GLASS
Filed Jan. 11, 1930    2 Sheets-Sheet 2
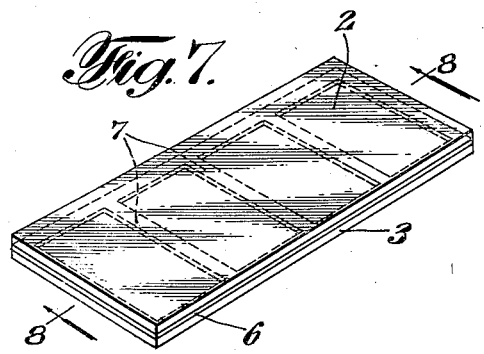
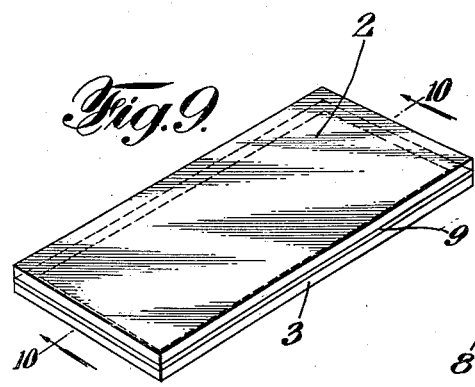
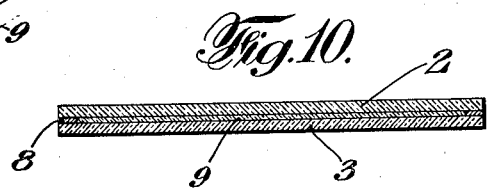
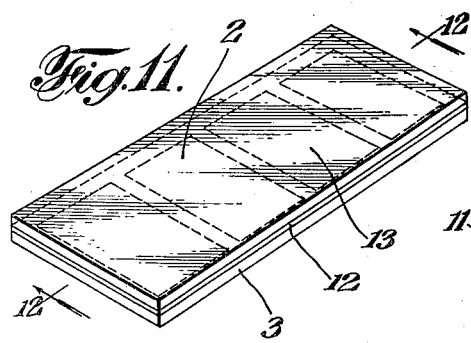
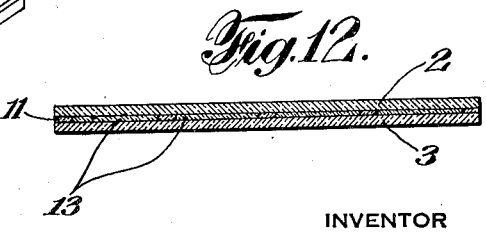
INVENTOR
James F. Walsh
BY
ATTORNEYS Patented Sept. 6, 1932

UNITED STATES PATENT OFFICE

JAMES F. WALSH, OF SOUTH ORANGE, NEW JERSEY, ASSIGNOR TO CELLULOID CORPORATION, A CORPORATION OF NEW JERSEY

LAMINATED GLASS

Application filed January 11, 1930. Serial No. 420,154.

This invention pertains to the general class of laminated products, and particularly to the class of laminated glass.

Laminated glass such as is used in windshields and windows of automobiles, is generally made by sandwiching a sheet of cellulosic plastic between two sheets of glass. In order to obtain a satisfactory product, it is necessary to use the utmost care in the manufacture of the cellulosic plastic sheets as well as in compositing same between the sheets of glass. Even though the height of care is exercised the percentage of rejects is relatively high due to many causes such as dust spots in the cellulosic plastic sheet, imperfect cementation of the cellulosic plastic sheet to the glass, blushing of the cellulosic plastic sheet, discoloration of the cellulosic plastic sheet, etc.

It can be readily seen that the cost of the final product is relatively high and even though perfect when made, is still apt to develop certain of the above mentioned defects. Among these are loosening of the cellulosic plastic sheet from the glass as well as the discoloration of same.

The chief function of laminated glass in automobiles is to protect the driver and other occupants from flying pieces of splintered or shattered glass in the event of an accident.

An object of my invention is to provide a novel protection against splintered or shattered glass.

A further object of my invention is to provide a novel shatterless glass.

A further object of my invention is to provide a novel shatterless glass of low cost; that does not tend to discolor; that does not tend to develop feathers and other spots due to separation of components; that does not produce blushing during manufacture; that is easily manufactured, and that is otherwise highly satisfactory for its intended purpose.

My invention comprises the substitution of a cellulosic plastic or other ring for the cellulosic sheet ordinarily used in laminated glass manufacture. The ring may be of any desired width and is preferably flush with the edges of the sheets of glass which it cements together. The space or pocket within the ring is occupied either by a gas under any desired pressure, for instance atmospheric, or a liquid, semi-liquid, or solid.

In some instances, I prefer to make the ring with one or more inner connecting portions or divisions producing much the same effect in appearance as cames in ordinary window frames. The plurality of spaces thus produced may likewise contain a gas, liquid, semi-liquid, or solid.

The presence of a gas or other mobile substance produces a cushioning effect, absorbs the shock, and spreads same over a large area. Inasmuch as practically all of the agencies which cause automobile glass to shatter move from the outside toward the glass, in most instances, the outer sheet of glass only is broken leaving the inner sheet intact. The flying splinters if any, are thus prevented from reaching the occupants of the car.

The ring itself will hold in place all long splinters which reach to the edge of the glass, whereas the modification having one or more divisions or cames will in itself, for all practical purposes, retain all splinters.

However, the use of my novel ring permits the use of filling materials which are ordinarily unsuited for laminated glass manufacture, but have high stability, transparent and adhesive characteristics. When these materials are in liquid or semi-liquid form there is no tendency for same to separate from the glass, and they are therefore at all times in adhesion with the glass. Among such materials are resin oil, containing any desired amount of resin to obtain the desired consistency; Canada balsam; gelatin in solutions, or sodium silicate in solutions to render same fluid or semi-fluid; condensation products of paratoluolsulphonamid and formaldehyde, for instance, the material known as "Santolite"; plasticizers such as dibutyl tartrate, diethyl phthalate, dibutyl phthalate, tricresyl phosphate, etc. containing gums such as ester gum, dammar gum, elemi gum, santarac gum; water white petroleum oils such as Russian mineral oil, etc. having adhesive substances incorporated therein; glycerine mixed with adhesive substances, etc.

The space within the ring may also be filled with a cellulosic plastic having higher adhesive and plastic properties than is ordinarily suitable when a continuous sheet is used. For instance the cellulosic plastic insert within the ring may be relatively high in plasticizer and/or may contain a relatively high percentage of gelatin, gums or other adhesive substances.

The advantage of these inserts having high adhesive characteristics as well as a high resistance to discoloration by heat or light will be readily appreciated by those skilled in the art.

In the drawings wherein like reference characters are appended to like parts throughout the various figures, Figure 1 is a perspective view of my novel ring.

Figure 2 is a perspective view showing my novel ring incorporated between two sheets of glass.

Figure 3 is a section on line 3—3 of Figure 2.

Figure 4 is a perspective view of a modification of the ring.

Figure 5 is a perspective view of a cellulosic plastic sheet comprising a ring and an insert.

Figure 6 is a perspective view of the modified form of ring having a plurality of inserts.

Figure 7 is a perspective view showing the modified ring of Fig. 4 incorporated between two sheets of glass.

Figure 8 is a cross section on the line 8—8 of Fig. 7.

Figure 9 is a perspective view showing the ring having an insert as shown in Fig. 5 incorporated between two sheets of glass.

Figure 10 is a cross section on line 10—10 of Fig. 9.

Figure 11 is a perspective view showing the modified form of ring having a plurality of inserts as shown in Fig. 6 incorporated between two sheets of glass.

Figure 12 is a cross section on the line 12—12 of Fig. 11.

Referring to the drawings, at 1 is shown a ring, the consistency and composition of which is preferably similar to that used for sheet material in laminated glass manufacture. In Figures 2 and 3 ring 1 is shown sandwiched between two sheets of glass 2 and 3, leaving a space or pocket 4 which may or may not be filled as above set forth.

At 5 in Figure 4 is shown a modified ring comprising a border 6 and a plurality of divisions or came-like strips 7. Figures 7 and 8 show this ring incorporated between two sheets of glass 2 and 3.

At 8 in Figure 5 is shown a novel sheet comprising a border 9 similar in all respects to ring 1, having an insert 10 of highly plastic and adhesive cellulosic plastic or other material. Figures 9 and 10 show this sheet incorporated between two sheets of glass 2 and 3.

At 11 in Figure 6 is shown a modified form of sheet comprising a border 12 in all respects similar to ring 6, having cellulosic plastic or other inserts 13 preferably or highly plastic and adhesive characteristics. Figures 11 and 12 show this form of sheet sandwiched between sheets of glass 2 and 3.

The rings 1 and 6 including the borders 9 and 11 when of a cellulosic plastic may be made by any means known in the art such as stamping from sheets of cellulosic plastic, either transparent or otherwise, or by molding or otherwise fabricating. If semi-solid or solid inserts such as 10 and 13 are to be incorporated within the rings or borders, same may for instance, be stamped, cut or molded to shape and immediately mounted in the rings or borders and incorporated therewith by means of heat and pressure to form an integral sheet, or the inserts may be incorporated by laying same within the rings or borders during the compositing with the glass, or a flowable dope may be used which upon evaporation of sufficient solvent, will have the desired consistency.

The compositing of the ring, with or without a filler, and the sheets of glass, may be accomplished by any means known in the art such as in vacuum bags, etc. The ring, or composite sheet, as the case may be, is preferably cemented in place between the sheets of glass by means of gelatin solution or its equivalent. If the space within the ring is to be filled with a liquid or semi-liquid, such material is preferably placed within the ring while the ring is resting upon the lower sheet of glass, and before the upper sheet of glass is put in place. This material, however, or any fluid, may be admitted into the space 4 after the ring 1 or 6 is cemented between the sheets of glass either before or after compositing. This may be accomplished by means of a channel through the edge of the ring 1 or 6 leading into the space 4 through which the fluid or semi-fluid may be admitted. Means such as an additional channel should be provided to permit air to escape from the space 4 as the filler is being admitted. After filling, the channels are plugged. This may be accomplished by means of plugs of cellulosic plastic or other material cemented in place by means of any suitable cement.

Composite sheets 8 and 11 may be composited between the sheets of glass in the same manner as the ordinary sheets of cellulosic plastic now in use.

Rings 1 and 6 and borders 9 and 12 may be of any desired composition. I do not limit myself to any specific formula, but find the following satisfactory:

Formula A

| | Parts |
|---|---|
| Cellulose nitrate | 100 |
| Camphor | 30–45 |

Formula B

| | Parts |
|---|---|
| Cellulose acetate | 100 |
| Diethyl phthalate | 30–45 |

Formula C

| | Parts |
|---|---|
| Cellulose acetate | 100 |
| Dibutyl tartrate | 30–45 |

Formula D

| | Parts |
|---|---|
| Cellulose ether (ethyl cellulose) | 100 |
| Methyl salicylate | 40–80 |
| Triphenyl phosphate | 5–10 |

For the inserts 10 and 13 I find the following satisfactory:

Formula E

| | Parts |
|---|---|
| Cellulose nitrate | 100 |
| Dibutyl phthalate | 50–100 |
| Gum | 5–15 |

Formula F

| | Parts |
|---|---|
| Cellulose acetate | 100 |
| Diethyl phthalate | 50–100 |
| Gum | 5–15 |

Formula G

| | Parts |
|---|---|
| Cellulose acetate | 100 |
| Dibutyl tartrate | 50–100 |

The liquid, semi-liquid or other fillers may be of any desired consistency to conform to the adhesive properties desired.

It is of course understood that the semi-solid and solid inserts 10 and 13 as well as the rings and borders 1, 6, 9, and 12 may be of any other material possessing the desired stability, transparent and/or adhesive characteristics. The term "liquid" as used in the claims is to be construed as including within its scope substances which are semi-liquid in nature.

Having described my invention it is obvious that many modifications may be made in the same within the scope of the claims without departing from the spirit of the invention.

I claim:

1. A laminated product comprising a layer of liquid substance sealed between transparent sheets.

2. A laminated product comprising a layer of liquid adhesive material sealed between transparent sheets.

3. A laminated product comprising a layer of transparent liquid adhesive material sealed between transparent sheets.

4. A laminated product comprising a layer of liquid substance sealed between transparent sheets, said liquid substance comprising resin oil.

5. A laminated product comprising a layer of liquid material sealed between transparent sheets, said liquid material comprising a condensation product of paratoluol-sulphonamid and formaldehyde.

6. A laminated product having the laminations thereof united by a ring enclosed within the edges thereof, the enclosure formed by the ring and the laminations being filled with a liquid cushioning substance.

7. A laminated product having the laminations thereof united by a ring enclosed within same, the space provided by the ring and the laminations being filled with a liquid cushioning adhesive material.

8. A laminated product having the laminations thereof united by a cellulosic plastic ring enclosed within the laminations, the space formed within the ring and the laminations being filled with a liquid cushioning material.

9. A laminated product having the laminations thereof united by a cellulosic plastic ring enclosed within the laminations, the space within the ring and the laminations being filled with a liquid cushioning adhesive material.

In testimony whereof, I have hereunto subscribed my name.

JAMES F. WALSH.